May 31, 1938.  R. E. CAMPBELL  2,119,200
REFLEX CAMERA
Filed April 15, 1936  3 Sheets-Sheet 1

INVENTOR
R. E. CAMPBELL

May 31, 1938.  R. E. CAMPBELL  2,119,200
REFLEX CAMERA
Filed April 15, 1936   3 Sheets-Sheet 2
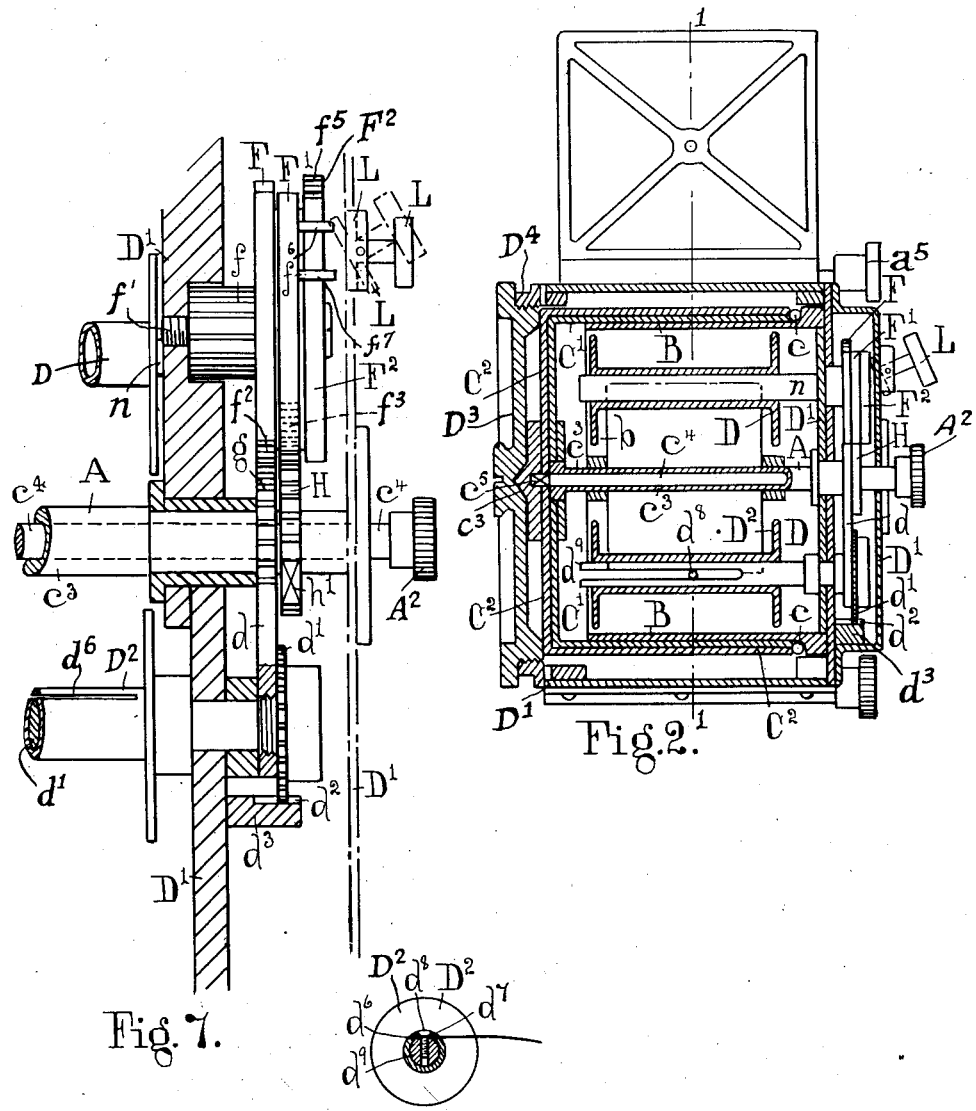
INVENTOR
R.E. CAMPBELL
BY Jowden O'Brien
atty.

Patented May 31, 1938

2,119,200

UNITED STATES PATENT OFFICE 2,119,200

REFLEX CAMERA

Robert Edward Campbell, York, England

Application April 15, 1936, Serial No. 74,454
In Great Britain May 2, 1935

3 Claims. (Cl. 88—16)

This invention relates to improvements in photographic cameras of the type having a rotating cylindrical shutter with one or more equally spaced exposure apertures therein and within which cylinder the supply reel, winding on reel and exposure gate together with the mechanism for holding the film in the exposure gate during exposure are situated.

According to the present invention the cylindrical shutter and the winding on spool are intermittently operated by mutilated pinions rotating in unison the teeth on which are so spaced and arranged as to operate the parts in the desired sequence and give one exposure at each revolution of the pinions.

Fig. 2 is a transverse section on line 2—2 Fig. 1.

Fig. 7 is a side elevation of same with parts in section.

Fig. 8 is a detail view of winding on spool.

The invention will be described with reference to a reflex camera having a view finder hood $A^1$, a ground glass screen $a^3$, a magnifying lens $a$, a pivoted reflex mirror $a^1$ and lens $a^2$ of ordinary construction.

In carrying out the invention the film supply spool D and winding on spool $D^2$ are mounted inside a rotating cylindrical shutter formed of two concentric cylinders $C^1$, $C^2$ with three exposure apertures which will be described hereafter.

The supply spool D is mounted on a fixed spindle $n$ in the casing $D^1$ of the apparatus and the winding on spool $D^2$ is mounted on a spindle $d^9$ carried by an arm $d$ pivotally mounted loosely on a spindle A extending through the casing $D^1$ and on which the rotating shutter $C^1$, $C^2$ is mounted and by which it is operated as will be hereinafter described.

A circular aperture is formed in the side of the casing $D^1$ adjacent to the rotating shutter $C^1$, $C^2$ through which the latter can be removed to give access to the spindles $n$ and $d^9$ for the purpose of inserting the spools D and $D^2$ thereon and removing them therefrom. The circular aperture is normally closed by a cover plate $D^3$ screwed into a ring $D^4$ affixed to the casing $D^1$ around the circular aperture.

When it is desired to insert a new film into the camera the leading end of the film is withdrawn from the supply spool D and passed through a tangential slot $d^6$ (see Fig. 8) in the spool $D^2$ and secured by a screw $d^8$ the end of which projects into the hollow centre of the spool $D^2$. The cover plate $D^3$ having been removed the two spools D and $D^2$ are placed on their respective spindles $n$ and $d^9$ the film between them being threaded laterally through a gate $b^1$ the construction and operation of which will be described later. The spindle $d^9$ is formed with an open ended longitudinal slot $d^7$ to receive the inner end of the screw $d^8$ whereby when the spindle $d^9$ is rotated the winding on spool $D^2$ will rotate with it.

Figure 1:
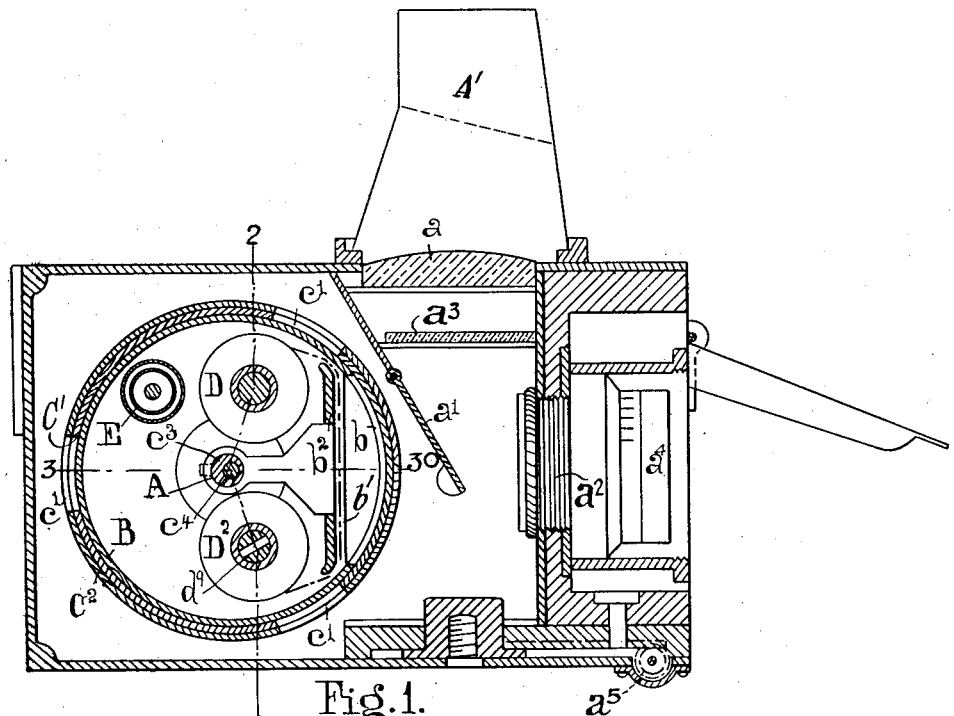
Fig. 1 is a longitudinal section on line 1—1 Fig. 2.
Figure 5:
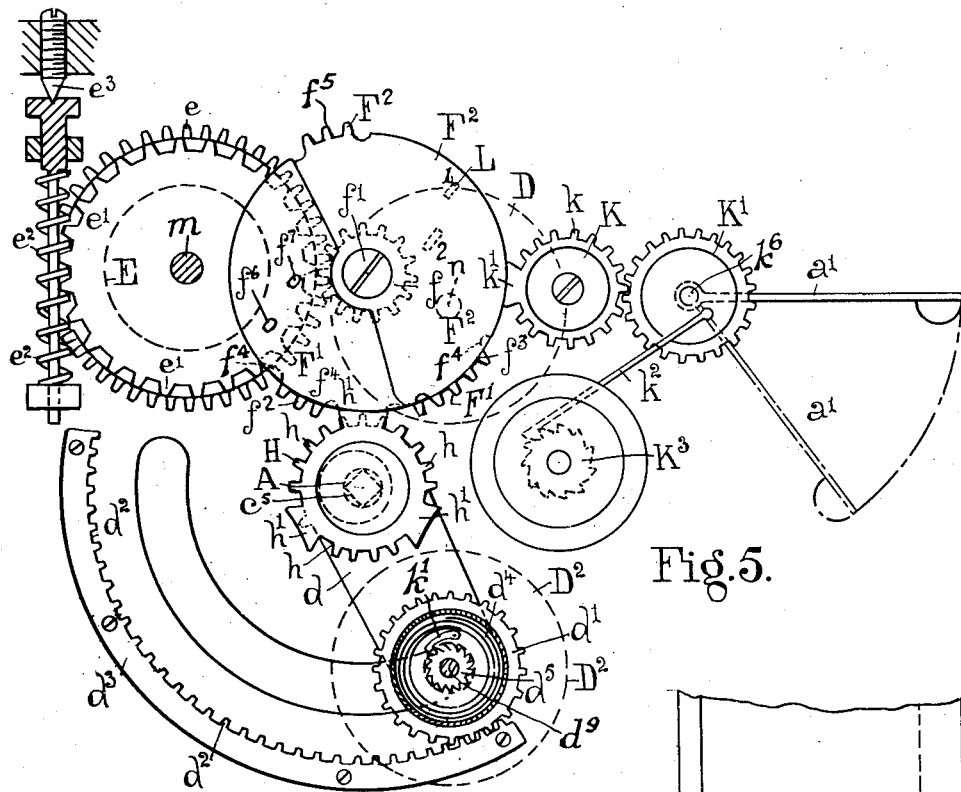
Fig. 5 is an enlarged elevation of driving mechanism.

The rotation of the shutters $C^1$, $C^2$ the operation of the film winding on spool $D^2$ and the raising of the reflex mirror $a^1$ from its normal view finding position shown in Fig. 1 and in dotted lines in Fig. 5 to its raised position shown in full lines in Fig. 5 out of the path of the light from the lens $a^2$ to the shutter must all be synchronized and driven from a common source. The drive for the operation of these parts is derived through gearing from a spring motor E of any usual construction and wound up by a knob M mounted on a shaft $m$ extending through the case, a pawl and ratchet or similar device (not shown) being provided to prevent the backward rotation of the shaft $m$ when the motor E is liberated to operate the different parts of the camera. Any suitable brake device may be employed for regulating the speed of the spring motor E, that shown in the drawings comprising an open helical spring $e^2$ mounted so as to be capable of rotation and also to be compressed by a regulating screw $e^3$ to vary the distance between the coils of the spring. The coils of the spring $e^2$ are engaged by helical teeth $e^1$ on the drum of the motor E so that by varying the distance between the coils of the spring $e^2$ greater or less friction will be applied to the teeth $e^1$ and the speed of the motor E varied accordingly.

The drum of the motor E also carries a toothed wheel $e$ which drives a pinion $f$ loosely mounted on a stud $f^1$ screwed into the casing $D^1$ and the pinion $f$ is formed in one with three mutilated pinions F, $F^1$ and $F^2$ which operate the winding on spool $D^2$, the shutter $C^1$, $C^2$ and the reflex mirror $a^1$ respectively.

The mutilated pinion F which operates the winding on spool $D^2$ is formed with three teeth $f^2$ on its periphery, the remainder of the periphery being a plain cylindrical surface. The teeth $f^2$ of the pinion F gear with pinion teeth $g$ formed on the end of the arm $d$ loosely mounted on the shaft A.

A pinion $d^1$ is loosely mounted on the spindle $d^9$ carried at the free end of the arm $d$ and on which the winding on spool $D^2$ is mounted and gears with rack teeth $d^2$ on a circular quadrant $d^3$. As the pinion F is rotated and the teeth $f^2$ thereon engage the teeth $g$ on the end of the arm $d$ the latter will be rotated and the pinion $d^1$ will travel over the rack $d^2$. The ratio between the pitch circle of the teeth $f^2$ on the mutilated pinion F and the pitch circle of the teeth $g$ on the end of the arm $d$ is such that for one engagement of the teeth $f^2$ with the teeth $g$ (i. e. each revolution of the pinion F) the arm $d$ is rotated through about 90°. Since the spool $D^2$ is mounted on the end of the arm $d$ the movement of the latter which is away from the gate $b^1$ and which is open during this movement a length of film is drawn from the spool D through the gate, the parts being so dimensioned and arranged that such length of film is equal to the length of film exposed at each exposure. To prevent the spool $D^2$ rotating in a direction to unwind the film therefrom during this operation a pawl $k^1$ is mounted on the arm $d$ and engages the teeth of a ratchet wheel $d^5$ affixed on the spindle $d^9$.

One end of a coil spring $d^4$ is attached to the spindle $d^9$ and the other end to the pinion $d^1$ so that as the latter moves up the rack $d^2$ this spring will be tightened up. When the teeth $f^2$ have moved out of engagement with the teeth $g$ the arm $d$ is free and the spring $d^4$ will cause a relative movement between the wheel $d^1$ and the spindle $d^9$ and such relative movement achieves the double purpose of rotating the wheel $d^1$ in a direction to cause it to travel down the rack to its initial position and to rotate the spindle $d^9$ to wind the length of film which has been drawn through the gate on to the spool $D^2$. During which movements the pawl $k^1$ rides on the teeth of the ratchet wheel $d^5$.

The pinion $F^1$ which operates the rotating shutter $C^1$, $C^2$ is formed with five teeth $f^3$ which gear with a pinion H affixed on the shutter spindle A the remainder of the periphery of the pinion $F^1$ being a plain cylinder. The pinion H is formed with three series of normal teeth $h$ each series being separated by a locking tooth $h^1$ and at each revolution of the pinion $F^1$ the teeth $f^3$ therein engage one series of the teeth $h$ and move the pinion H one-third of a revolution and as the rotary shutter $C^1$, $C^2$ is formed with three exposure apertures $c^1$ one aperture will be brought across the exposure position at each revolution of the pinion $F^1$. The teeth $h$ are so positioned relative to the exposure apertures that when an aperture $c^1$ is in the exposure position corresponding series of teeth $h$ of the pinion H are about half-way through their movement and when the teeth $f^3$ move out of engagement with the teeth $h$ the aperture $c$ has passed the exposure position. When the teeth $f^3$ become disengaged from the teeth $h$ the succeeding lock tooth $h^1$ engages the plain portion of the periphery of the pinion $F^1$ to prevent rotation of the pinion H until the locking tooth $h^1$ is again met by the teeth $f^3$ when it is rotated to bring the next series of teeth $h$ into engagement with the teeth $f^3$ whereupon the shutter is again operated. The shutter makes one complete revolution every three exposures.

The periphery of the pinion $F^1$ is recessed at $f^4$ at each end of the series of teeth $f^3$ thereon to allow the locking teeth $h^1$ to move into and out of engagement with the periphery.

The pinion $F^2$ operating the reflex mirror $a^1$, is cut away for substantially half of its periphery and is formed with three teeth $f^5$ on a portion of the remainder, in proximity to the leading edge (considered in the direction of rotation) of the uncut away portion of the periphery. At each revolution of the pinion $F^2$ the teeth $f^5$ gear with teeth $k$ on a pinion K affixed on a sleeve $k^4$ mounted on a stud $k^5$ which sleeve has a second pinion $K^2$ affixed to it. The pinion $K^2$ drives a pinion $K^1$ keyed on to a spindle $k^6$ to which the reflex mirror $a^1$ is affixed. A locking tooth $k^1$ is arranged on the pinion K to come into engagement with the plain cylindrical portion of the pinion $F^2$ as soon as the teeth $f^5$ of the latter have moved away from the normal teeth $k$ which occurs immediately the mirror $a^1$ has been raised into the horizontal position, shown in full lines in Fig. 5, from between the lens $a^2$ and the gate $b^1$. The engagement of the locking tooth $k^1$ with the plain surface of the pinion $F^2$ retains the mirror $a^1$ in the raised position until the pinion $F^2$ has moved to the position where the locking tooth $k^1$ will no longer be in engagement with the periphery. When this occurs the pinion K is freed and the mirror $a^1$ will fall by gravity into its original position shown in dotted lines in Fig. 5 and the pinion K will be rotated by the movement of the mirror $a^1$ into its original position so that its teeth $h$ can be engaged again by the teeth $f^5$ of the pinion $F^2$.

A pawl $k^2$ is pivoted to the pinion $K^1$ engaging teeth on a wheel $K^3$ which is rotated one tooth each time the mirror $a^1$ is raised. The wheel $K^3$ is marked with numerals visible in turn through a window in the casing $D^1$ to indicate the number of movements of the wheel $K^3$ and since the latter is moved once for each revolution of the pinion $F^2$ which rotates in unison with the pinion $F^1$ and the latter operates the shutter $C^1$, $C^2$ once for each revolution the number visible through the window will indicate the number of exposures which have been made.

Figure 6:
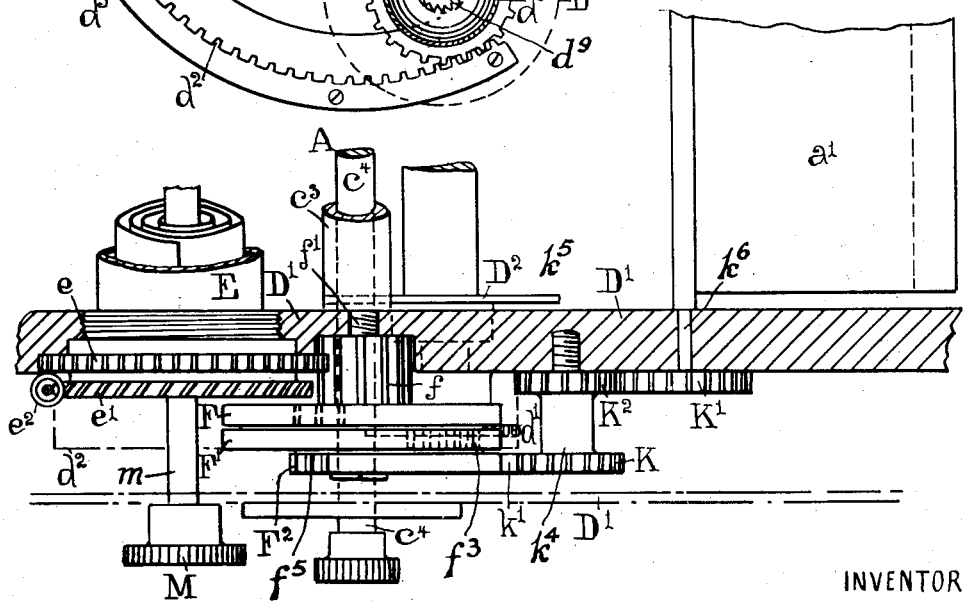
Fig. 6 is a plan of same.

It will be understood that the relative positions of the teeth $f^2$ on the pinion F, the teeth $f^3$ on the pinion $F^1$ and the teeth $f^5$ on the pinion $F^2$ and also the relative position of the cut away portion of the pinion $F^2$ must be such as to give the desired sequence of operations each time the pinion $f$ is rotated by the spring drum or motor E. The sequence of operations is as follows, first the reflex mirror $a^1$ is raised from the dotted line position to the full line position shown in Fig. 5, then one of the three exposure apertures $c^1$ in the shutter $C^1$, $C^2$ is moved past the gate $b^1$ and finally the arm $d$ is rotated to pull the exposed length of film through the gate and bring an unexposed length into position therein for the next exposure, the length of film pulled through the gate being wound up on to the spool $D^2$ during the return of the arm $d$ as has been previously described. In Figs. 5 and 6 the parts are shown in the positions they occupy immediately after an exposure has taken place and before the exposed film is pulled through the gate. The teeth $f^5$ on the pinion $F^2$ have travelled more than one-quarter of a revolution after rotating the pinion K to raise the mirror $a^1$ the pinion being retained in its raised position by the engagement of the locking tooth $k^1$ with the plain surface of the pinion $F^1$ to lock the pinion H until the teeth $f^3$ again engage the locking tooth and the teeth $f^2$ on the pinion F are about to engage the teeth $g$ on the end of the arm $d$ to rotate the latter to pull the exposed length of film through the gate.

Since as hereinbefore described the pinions F, $F^1$, $F^2$ make one revolution for each exposure it is necessary to provide means whereby their rotation will be stopped after they have made substantially one revolution. Such means comprise two pins or stops $f^6$ and $f^7$ projecting from the face of the pinion $F^1$ where it is not covered by the pinion $F^2$ and in a position a short distance behind the teeth $f^2$. A catch L pivotally mounted on the casing $D^1$ and adapted to occupy the position shown in Fig. 2 or in dotted lines in Fig. 7 or a position at substantially 90° thereto or to be held in the position shown in full lines in Fig. 7 midway between the two extreme inclined positions. When the catch L is in one or other of the extreme positions it lies in the path of one or other of the pins $f^6$, $f^7$ thereby preventing rotation of the pinion F, $F^1$, $F^2$ and operation of the shutter and other parts of the mechanism. Both the extreme positions 1 and 2 of the catch L are indicated in dotted lines on Fig. 5 and one or other of the pins $f^6$, $f^7$ will engage the catch to hold the pinions in a position with the teeth $f^5$ on the pinion $F^2$ a short distance away from the pinion K since when the teeth $f^5$ are in this position the teeth on all the pinions F, $F^1$, and $F^2$ are out of engagement with the gears which they drive, the shutter $C^1$, $C^2$ is in its inoperative position, the mirror $a^1$ is lowered and the spool $D^2$ carried by the arm $d$ is in its normal position moreover, as soon as the catch L is moved from the pin $f^6$ to release the mechanism the teeth $f^5$ on the pinion $F^2$ will come into operation first to raise the mirror $a^1$ and so commence the cycle of operations.

To release the mechanism for the purpose of making a single exposure the catch L is turned over from one extreme position to the other so that if it were originally in position 1 engaged by the pin $f^6$ it is moved into position 2. During this movement the second pin $f^7$ will have moved past the position 2 and the catch will now lie behind the second pin $f^7$ and be engaged thereby when the pinions F, $F^1$, and $F^2$ have completed substantially one revolution. The mechanism is thus stopped until the catch L is again moved into position 1 when substantially another revolution will be made.

For continuous operation the catch L is moved into the central position shown in full lines in Fig. 7 and clear of both pins $f^6$ and $f^7$ when the camera will continue to make successive exposures until the catch is moved into one or other of its extreme positions.

Figure 3:
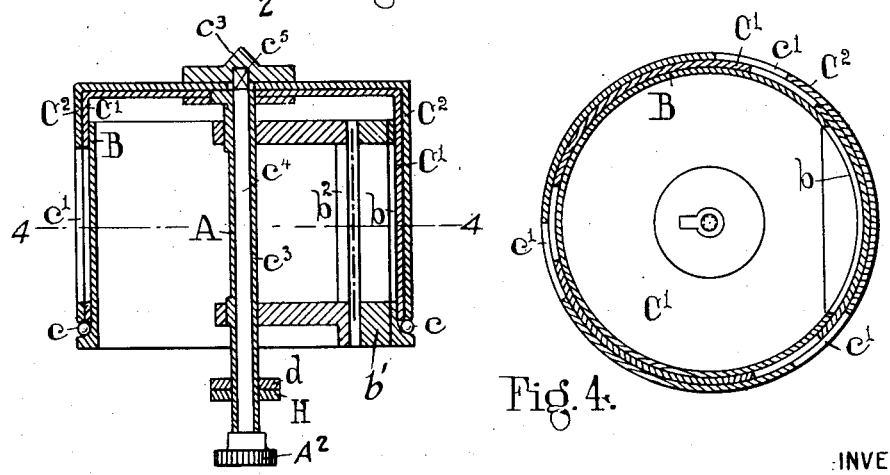
Fig. 3 is a sectional plan of shutter on line 3—3 Fig. 1.
Figure 4:
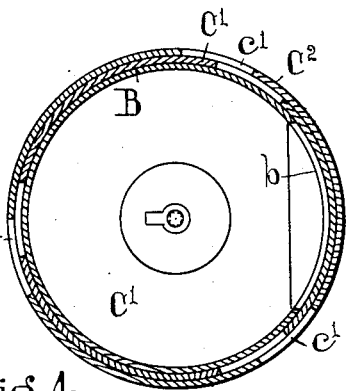
Fig. 4 is a transverse section on line 4—4 Fig. 3.

The shutter as previously stated is formed with three exposure apertures $c^1$ variable in size and is formed of two concentric cylinders arranged to rotate outside a stationary cylinder B having an aperture $b$ behind which is arranged the gate $b^1$. The cylinder B is open at both ends as shown in Fig. 3 and may be fitted with a ball race $c$ at either one or both ends. The cylinder $C^1$ is affixed directly on the spindle A and the cylinder $C^2$ on a spindle $c^4$ passing through the spindle A which is hollow the two cylinders being a sufficiently tight fit one within the other so that when the shaft A is rotated by the gear wheel H the two cylinders will rotate in unison. The exposure apertures $c^1$ on the cylinder $C^2$ coincide with those in the cylinder $C^1$ and to vary the effective size of each aperture it is only necessary to rotate the cylinder $C^2$ relative to the cylinder $C^1$. For this purpose the spindle $c^4$ projects through the outer end of the spindle A and is provided with a knob $A^2$ by which it can be rotated in relation thereto. Thus when the spindle A and consequently the cylinder $C^1$ is prevented from rotation by the catch L being in engagement with one or other of the pins $f^6$ or $F^7$ rotation of the spindle $c^4$ by the knob A will rotate the cylinder $C^2$ and alter the effective size of the exposure apertures.

Longitudinal movement of the cylinders $C^1$ and $C^2$ is prevented by the plate $C^3$ which engages the end of the spindle $c^4$ and is held in position by the cover plate $D^3$. The plate $C^3$ is formed with a conical portion $c^3$ which fits into a corresponding recess in the cover plate $D^3$ to permit the plate $C^3$ to rotate with the shaft $c^4$ whilst the plate $D^3$ remains stationary.

As previously stated the film is drawn through a gate $b^1$ behind the aperture in the stationary cylinder B. The film is held in this gate during the exposure of the film by a pressure plate $b^2$ mounted eccentrically on the main spindle A whereby the pressure plate will intermittently hold the film flat in the gate during each pressure.

The operation of the different parts of the camera has been described in the foregoing description but the following brief summary will enable the operations necessary to make an exposure to be more readily understood:—

If necessary the exposure apertures $c^1$ in the shutter are adjusted by the knob $A^2$ and the spring motor E is wound up, rotation of the driving pinions F, $F^1$, and $F^2$ being prevented by the engagement of one or other of the pins $f^6$ or $f^7$ with the catch L. The catch L is then moved to release the pinions F, $F^1$, and $F^2$ and the latter commence to rotate.

The teeth $f^5$ on the pinion $F^2$ comes into operation first to raise the mirror $a^1$ and the locking tooth $k^1$ rides on the plain portion of the periphery of the pinion to retain the mirror in the raised position. The teeth $f^3$ on the pinion $F^1$ then come into gear with the teeth $h$ on the pinion H to operate the shutter and give an exposure; after which further movement of the shutter is prevented by the locking tooth $h^1$ on the pinion H engaging the plain surface of the pinion $F^1$. When the movement of the shutter is completed the teeth $f^2$ on the pinion F engage the teeth $g$ operating the arm $d$ carrying the winding on spool $D^2$ and the pressure plate $b^2$ having been released from the film, the exposed length of film is drawn from the gate and on the return movement of the arm $d$ wound on to the spool $D^2$. When the pinions F, $F^1$, $F^2$ have substantially completed a revolution the catch L is again engaged by the other of the two pins $f^6$ or $f^7$ and the cycle of operations is at an end only to be recommenced on a further actuation of the catch L.

If it is desired that a series of exposures should be made without stopping the rotation of the pinions F, $F^1$, $F^2$ it is only necessary to hold the catch L in the position midway between the two extreme positions when the cycle of operations will be continued without intermission until the catch is again moved into one of the extreme positions.

What I claim as my invention and desire to protect by Letters Patent is:—

1. A camera of the type referred to comprising mutilated pinions rotated in unison, teeth on a portion of the periphery of each mutilated pinion, a gear wheel periodically engaged by the teeth on one pinion to intermittently rotate the shutter to give one exposure for each revolution of the mutilated pinion, a swinging arm upon one end of which the take up spool is mounted, a second mutilated pinion with which the other end periodically engages whereby the arm moves away from the exposure aperture of the shutter after an exposure has been made to draw away from the aperture the exposed length of film and replace it by an unexposed length and mechanism for winding up the length of film so drawn away and for returning the take up spool to its original position.

2. A camera of the type referred to comprising a spring motor, mutilated pinions rotated in unison driven by the spring motor, teeth on a portion of the periphery of each mutilated pinion, a gear wheel periodically engaged by the teeth on one pinion to intermittently rotate the shutter to give one exposure for each revolution of the mutilated pinion, a swinging arm upon one end of which the take up spool is mounted, a second mutilated pinion with which the other end periodically engages whereby the arm moves away from the exposure aperture of the shutter after an exposure has been made to draw away from the aperture the exposed length of film and replace it by an unexposed length, mechanism for winding up the length of film so drawn away and for returning the take up spool to its original position and a catch to stop the rotation of the mutilated pinions after one revolution.

3. A camera of the type referred to comprising a spring motor, mutilated pinions rotated in unison driven by the spring motor, teeth on a portion of the periphery of each mutilated pinion, a gear wheel periodically engaged by the teeth on one pinion to intermittently rotate the shutter to give one exposure for each revolution of the mutilated pinion, a swinging arm upon one end of which the take up spool is mounted a second mutilated pinion with which the other end periodically engages whereby the arm moves away from the exposure aperture of the shutter after an exposure has been made to draw away from the aperture the exposed length of film and replace it by an unexposed length, mechanism for winding up the length of film so drawn away and for returning the take up spool to its original position, a reflex mirror pivotally mounted within the camera, a third mutilated pinion of approximately semi-circular shape a gear wheel operating the reflex mirror and engaging periodically with the third mutilated pinion to raise the mirror before each exposure takes place the mirror being returned by gravity after each exposure when the gear wheel comes out of contact with the periphery of the mutilated pinion and a catch to stop the rotation of the mutilated pinions after one revolution.

ROBERT EDWARD CAMPBELL.